United States Patent [19]

Murphy et al.

[11] 4,037,361
[45] July 26, 1977

[54] PLANT WATERING STICK

[76] Inventors: William R. Murphy; Frances H. Murphy, both of 1210 W. Boynton Road, No. 114, Boynton Beach, Fla. 33435

[21] Appl. No.: 721,345

[22] Filed: Sept. 8, 1976

[51] Int. Cl.² ............................................. A01G 29/00
[52] U.S. Cl. ......................................... 47/48.5; 239/33; D7/42; 40/10 C; 47/55; 47/41.11
[58] Field of Search ........................ 47/48.5, 55, 41.11; 239/33; D35/2 R; D94/3 D; D7/42; 40/10 C; 46/116

[56] References Cited
U.S. PATENT DOCUMENTS

| | | | |
|---|---|---|---|
| 1,424,157 | 8/1922 | Cook | 47/48.5 |
| 2,209,873 | 7/1940 | Cross | 40/10 C |
| 2,602,250 | 7/1952 | Raising | 40/10 C |
| 2,619,770 | 12/1952 | Dinhofer | 239/33 X |
| 3,177,617 | 4/1965 | Koistinen | 47/41.11 |
| 3,409,224 | 11/1968 | Harp et al. | 239/33 |
| D.158,596 | 5/1950 | Lack | 47/48.5 X |

*Primary Examiner*—Robert E. Bagwill
*Attorney, Agent, or Firm*—Allen D. Brufsky

[57] ABSTRACT

A tubular stick of predetermined fluid-holding capacity is provided with a funnel-shaped end portion, whose mouth is rotatable from a vertical to a horizontal plane about an accordian-pleated bending hinge. A decorative cap is hingedly connected to the funnel-shaped end portion, to close the top of the stick. The stick is filled with water and/or water and plant food to feed a plant, and the funnel disposed in a vertical plane so the cap provides a decorative ornament for the plant.

8 Claims, 6 Drawing Figures

U.S. Patent          July 26, 1977          4,037,361
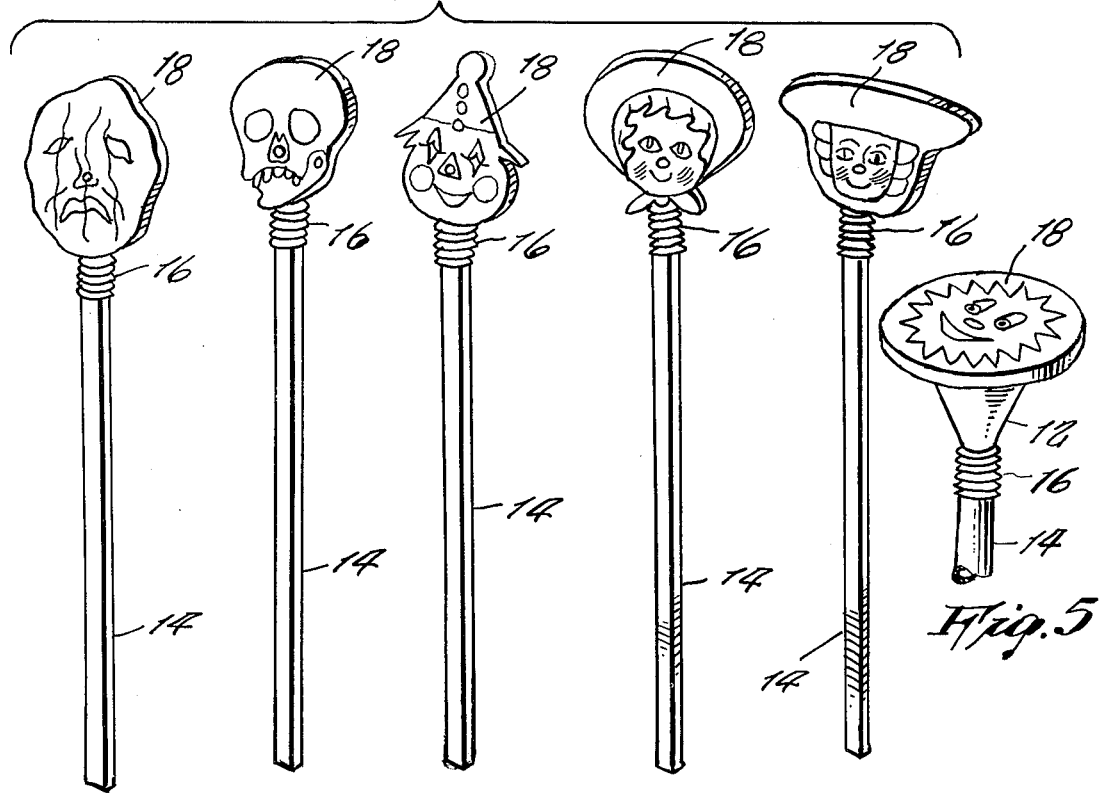
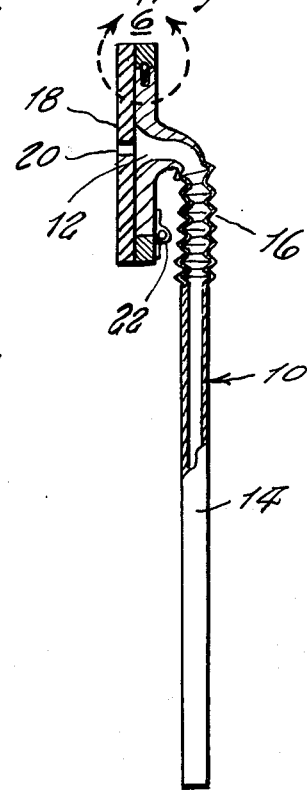
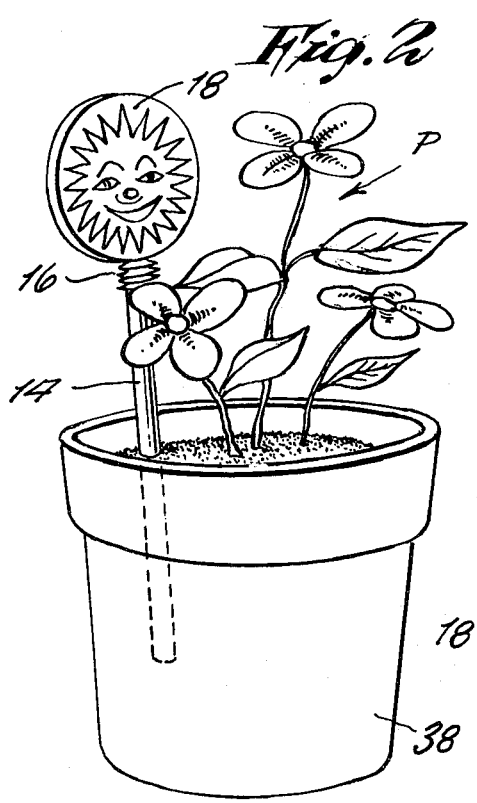
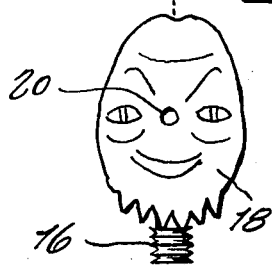
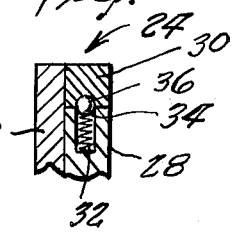

PLANT WATERING STICK

BACKGROUND OF THE INVENTION

This invention relates to a device for delivering a precise amount of water or water admixed with a nutrient to a house plant.

House plants are often overwatered or require nutrients. This invention provides a tube or stick for delivering a predetermined amount of water or water admixed with a nutrient to a potted house plant, the amount being sufficient to feed the plant but not of a quantity to be detrimental to its growth.

SUMMARY OF THE INVENTION

In accordance with the invention, a tubular stick of predetermined fluid holding capacity is provided with a flared or funnel-shaped end portion, whose mouth is rotatable from a horizontal to a vertical plane about an accordian-pleated bending hinge. A cap in the shape of a suitable decoration reflecting the mood of the plant is hingedly connected to the funnel-shaped end portion, which is also provided with a clasp for holding the cap closed on top of the funnel-shaped mouth. With the funnel-shaped end in a substantially horizontal plane and the tubular stick in the earth surrounding the potted plant, water and/or water admixed with a nutrient is fed into the stick which delivers the same to the roots of the plant. The mouth can then be bent to a vertical orientation and the cap closed to provide a decorative ornament for the plant.

BRIEF DESCRIPTION OF THE DRAWING

Further objects and advantages of the invention will become apparent from the following description and claims, and from the accompanying drawing, wherein:

FIG. 1 is a perspective view of a plurality of the plant watering sticks of the present invention, each of which includes a distinctive cap design;

FIG. 2 is a perspective view of another embodiment of a plant watering stick of the invention inserted in a pot of a house plant;

FIG. 3 is a front view in elevation of yet another plant watering stick;

FIG. 4 is a cross-sectional view taken substantially along the plane indicated by line 4—4 of FIG. 3;

FIG. 5 is a perspective view of the plant watering stick of FIG. 4 in position to receive water and/or water admixed with a nutrient to be dispensed to a plant; and FIG. 6 is an enlarged detailed view of the circled portion of FIG. 4.

DETAILED DESCRIPTION OF THE PREFERRED EMBODIMENT

Referring now in detail to the drawing, wherein like numerals indicate like elements throughout the several views, a tubular stick 10 of a predetermined fluid holding capacity is provided with a conical or funnel shaped end portion 12 connected to one end of an elongated tubular body 14.

The mouth of funnel 12 is rotatable from a substantially horizontal plane to a vertical plane about an accordian-pleated bending hinge 16 similar to that used in a bendable drinking straw. A cap 18 having an air hole 20 therethrough is connected by a hinge 22 to the outer sidewall of funnel 12. A clasp 24 is provided between cap 18 and funnel 12 for holding cap 18 closed on the top of funnel 12.

Clasp 24 includes a housing 26 attached to the sidewall of funnel 12 and a depending lip 30 on cap 18. A spring 32 is mounted in housing 26 and has a ball detent 34 connected to its outer end received and urged by spring 32 into a depression 36 in lip 30.

With the funnel 12 in a substantially horizontal position, as shown in FIG. 5, and stick 10 having its tubular body 14 inserted in the earth in a pot 38 containing plant P, as shown in FIG. 2, with cap 18 opened, water and/or water admixed with a nutrient is fed into stick 10 through the mouth of funnel 12, which delivers the same to the roots of plant P. The cap 18 can then be pivoted closed and bent to a vertical orientation to provide a decorative ornament for plant P.

The decorative ornament is provided either by shaping the outer periphery of the cap 18 or a drawing on cap 18. The ornament can reflect the disposition and health of the plant P, or be of any other suitable design. For example, cap 18, as shown in FIG. 1, can be shaped as prune-faced, a skull, a happy clown or in a figure appropriate to a bicentennial celebration. FIGS. 2 and 3 illustrate a happy sunshine cap. Further, tubular body 14 can either be rectangular or circular in cross-section.

We claim:

1. A plant watering device comprising:
   an elongated tubular body having a funnel-shaped end portion;
   a cap pivotably connected to said funnel-shaped end portion; and
   bendable hinge means on said tubular body adjacent said funnel-shaped end portion for rotating said funnel-shaped end portion from a substantially horizontal to a substantially vertical plane.

2. A device in accordance with claim 1 wherein said cap includes a decorative design.

3. A device in accordance with claim 1 including clasp means between said cap and funnel-shaped end portion.

4. A device in accordance with claim 3 wherein said clasp means includes:
   a lip on said cap having a depression; and
   a housing extending radially from said funnel-shaped end portion having a spring-biased detent extending outwardly from said housing into said depression.

5. A device in accordance with claim 1 including an air opening through said cap.

6. A device in accordance with claim 1 wherein said bendable hinge means includes an accordian-pleated bending hinge.

7. A device in accordance with claim 1 wherein said tubular body is circular in cross-section.

8. A device in accordance with claim 1 wherein said tubular body is rectangular in cross-section.

* * * * *